US011237129B2

(12) United States Patent
Watanabe et al.

(10) Patent No.: US 11,237,129 B2
(45) Date of Patent: *Feb. 1, 2022

(54) SENSOR ELEMENT AND GAS SENSOR

(71) Applicant: NGK INSULATORS, LTD., Aichi (JP)

(72) Inventors: Yusuke Watanabe, Nagoya (JP); Shiho Iwai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 122 days.

This patent is subject to a terminal disclaimer.

(21) Appl. No.: 15/938,242

(22) Filed: Mar. 28, 2018

(65) Prior Publication Data

US 2018/0284057 A1    Oct. 4, 2018

(30) Foreign Application Priority Data

Mar. 30, 2017    (JP) .............................. JP2017-067780

(51) Int. Cl.
| *G01N 27/41* | (2006.01) |
| *G01N 27/407* | (2006.01) |
| *G01N 27/30* | (2006.01) |
| *G01N 27/406* | (2006.01) |

(52) U.S. Cl.
CPC ........... *G01N 27/41* (2013.01); *G01N 27/301* (2013.01); *G01N 27/4067* (2013.01); *G01N 27/4071* (2013.01); *G01N 27/4072* (2013.01); *G01N 27/4074* (2013.01)

(58) Field of Classification Search
CPC .. G01N 27/41; G01N 27/301; G01N 27/4067; G01N 27/4071; G01N 27/4072; G01N 27/4074; G01N 27/406; G01N 27/407; G01N 27/30

See application file for complete search history.

(56) References Cited

U.S. PATENT DOCUMENTS

| 5,124,021 A | * | 6/1992 | Kaneyasu | ............ | G01N 27/417 204/425 |
| 2005/0034986 A1 | * | 2/2005 | Scheer | ............... | G01N 27/4075 204/426 |

(Continued)

FOREIGN PATENT DOCUMENTS

| JP | 2014190940 A | * | 10/2014 |
| JP | 2015-200643 A | | 11/2015 |
| WO | 2013/005491 A1 | | 1/2013 |

*Primary Examiner* — James Lin
*Assistant Examiner* — Vivian A Tran
(74) *Attorney, Agent, or Firm* — Mattingly & Malur, PC

(57) ABSTRACT

A sensor element includes a layered body that includes a measurement-object gas flowing portion which a measurement object gas is introduced and flowed in and a reference electrode that is formed inside of the layered body and a reference gas introducing layer made of a porous material that introduces a reference gas being used as a standard for detection of a specific gas concentration in the measurement-object gas and that flows the reference gas to the reference electrode, the reference gas introducing layer including an inlet portion serving as an inlet of the reference gas and one or more gas flowing spaces provided over a region from the inlet portion to the reference electrode in a direction in which the reference gas is flowed.

7 Claims, 8 Drawing Sheets

(56) References Cited

U.S. PATENT DOCUMENTS

| | | | |
|---|---|---|---|
| 2006/0137979 A1* | 6/2006 | Strassner | G01N 27/4071 204/424 |
| 2009/0120791 A1* | 5/2009 | Miyashita | G01N 27/4077 204/412 |
| 2009/0242404 A1* | 10/2009 | Miyashita | G01N 27/4071 204/431 |
| 2014/0102170 A1 | 4/2014 | Kato | |
| 2015/0276659 A1* | 10/2015 | Sekiya | G01N 27/417 204/416 |
| 2018/0284052 A1* | 10/2018 | Watanabe | G01N 27/4071 |
| 2018/0284053 A1* | 10/2018 | Watanabe | G01N 27/4071 |
| 2018/0284056 A1* | 10/2018 | Watanabe | G01N 27/301 |
| 2018/0284058 A1* | 10/2018 | Watanabe | G01N 27/419 |

\* cited by examiner

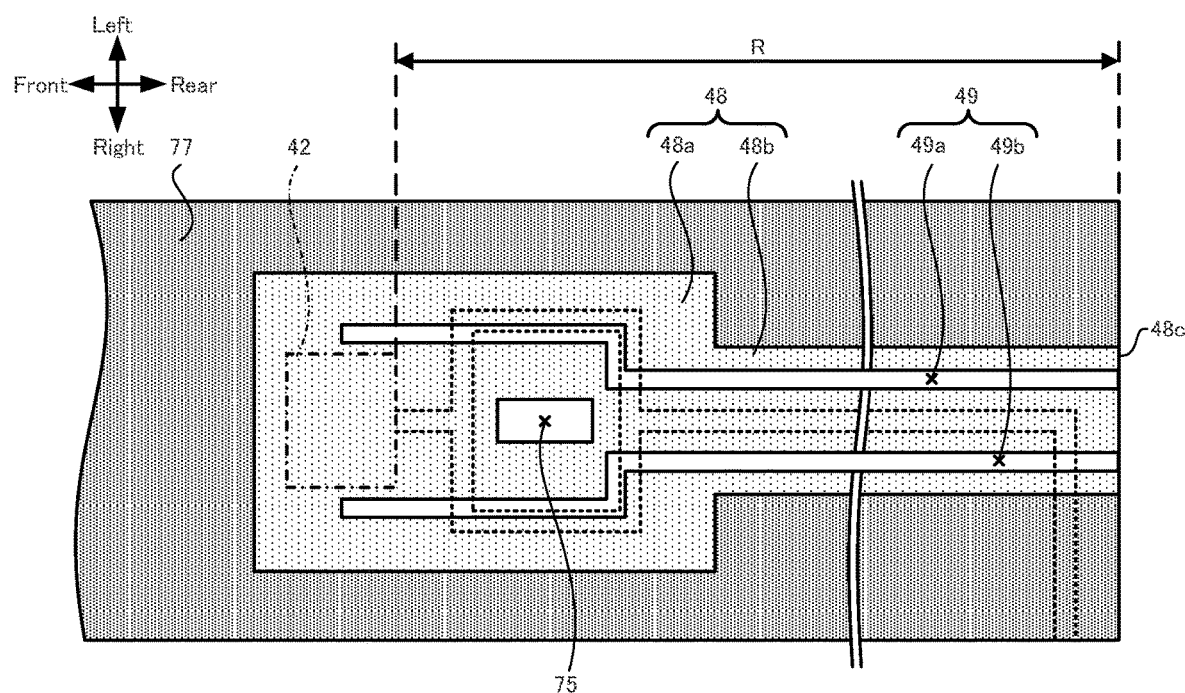
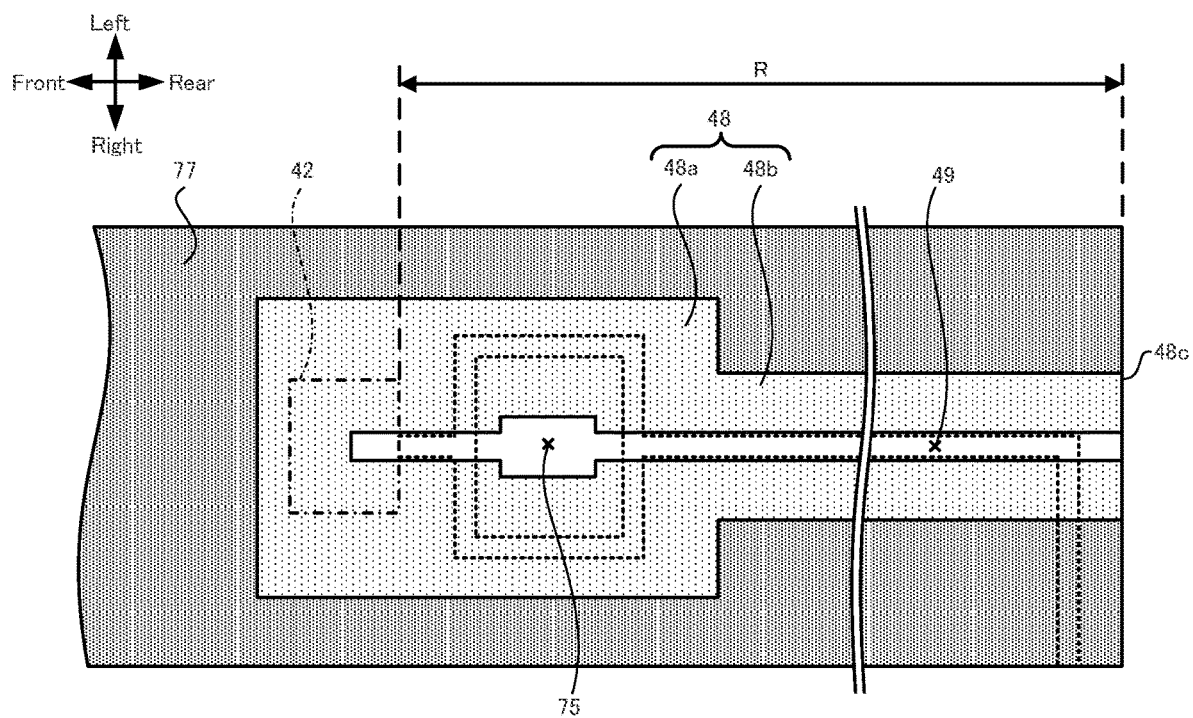

SENSOR ELEMENT AND GAS SENSOR

BACKGROUND OF THE INVENTION

1. Field of the Invention

The present invention relates to a sensor element and a gas sensor.

2. Description of the Related Art

A conventionally known gas sensor detects a specific gas concentration such as NOx in a measurement-object gas such as an exhaust gas of an automobile. For example, PTL 1 describes a gas sensor including a layered body, a reference electrode, a measurement electrode, and a measurement-object gas side electrode. The layered body is formed by stacking a plurality of oxygen ion-conductive solid electrolyte layers. The reference electrode is formed inside of the layered body and receives a reference gas (e.g., air) introduced therein via a reference gas introducing space. The measurement electrode is provided in a measurement-object gas flowing portion inside the layered body. The measurement-object gas side electrode is provided in a region of the layered body exposed to the measurement-object gas. The gas sensor detects the specific gas concentration in the measurement-object gas on the basis of an electromotive force generated between the reference electrode and the measurement electrode. In addition, the gas sensor further includes a reference gas regulating device that pumps in oxygen to a periphery of the reference electrode by a flow of control current between the reference electrode and the measurement-object gas side electrode. PTL 1 describes that the reference gas regulating device pumps in oxygen to the periphery of the reference electrode so as to compensate for reduction of the oxygen concentration caused in a case of temporary reduction of the oxygen concentration in the reference gas in the periphery of the reference electrode and to suppress a decrease of the detection accuracy of the specific gas concentration. Note that a case of reduction of the oxygen concentration in the reference gas in the periphery of the reference electrode is a case in which, for example, the measurement-object gas slightly enters the reference gas introducing space.

CITATION LIST

Patent Literature

PTL 1: JP 2015-200643 A1

SUMMARY OF THE INVENTION

However, in a case in which oxygen is pumped in to the periphery of the reference electrode as in PTL 1, the oxygen concentration in the periphery of the reference electrode may become excessively higher than an original oxygen concentration in the reference gas in some cases. Thus, the detection accuracy of the specific gas concentration of the sensor element may be decreased in some cases.

The present invention has been made to solve such problems, and its main object is to suppress a decrease in the detection accuracy of the specific gas concentration.

In order to achieve the above main object, the present invention is configured as follows.

A sensor element of the present invention includes
a layered body that includes a plurality of stacked layers of an oxygen ion-conductive solid electrolyte, and that includes a measurement-object gas flowing portion which a measurement object gas is introduced and flowed in;
a measurement electrode provided on an inner peripheral surface of the measurement-object gas flowing portion;
a measurement-object gas side electrode provided in a region of the layered body that is exposed to the measurement-object gas;
a reference electrode that is formed inside of the layered body; and
a reference gas introducing layer made of a porous material that introduces a reference gas being used as a standard for detection of a specific gas concentration in the measurement-object gas and that flows the reference gas to the reference electrode, the reference gas introducing layer including an inlet portion serving as an inlet of the reference gas and one or more gas flowing spaces provided over a region from the inlet portion to the reference electrode in a direction in which the reference gas is flowed.

This sensor element flows control current between the reference electrode and the measurement-object gas side electrode to pump in oxygen to a periphery of the reference electrode. This can, for example, compensate for reduction of the oxygen concentration in the periphery of the reference electrode if the measurement-object gas enters the reference gas introducing layer. The sensor element includes the reference gas introducing layer made of a porous material that introduces the reference gas being used as a standard for detection of a specific gas concentration in the measurement-object gas and that flows the reference gas to the reference electrode. The reference gas introducing layer includes the one or more gas flowing spaces provided over the region from the inlet portion of the reference electrode to the reference electrode in the direction in which the reference gas is flowed. Thus, the one or more gas flowing spaces can achieve at least one of the following: oxygen that is pumped in to the periphery of the reference electrode can immediately reach the inlet portion; and the reference gas can immediately reach the reference electrode from the inlet portion. This makes it possible to prevent the oxygen concentration in the periphery of the reference electrode from being excessively higher than the original oxygen concentration in the reference gas. Accordingly, the sensor element can suppress a decrease of the detection accuracy of the specific gas concentration. Note that the "region from the inlet portion to the reference electrode" includes the vicinity of the inlet portion and the vicinity of the reference electrode as long as the above-described effect can be obtained. That is, as long as the above-described effect can be obtained, the region in which the one or more gas flowing spaces are present not necessarily reach the inlet portion or reach the reference electrode by a slim margin in the direction in which the reference gas is flowed.

In the sensor element of the present invention, each of the one or more gas flowing spaces may be separated from the reference electrode. For example, if the reference electrode is exposed to the one or more gas flowing spaces at the time the measurement-object gas enters the reference gas introducing layer, a poisoning substance in the measurement-object gas may pass through the one or more gas flowing spaces to reach the reference electrode in some cases. In contrast, since each of the one or more gas flowing spaces is separated from the reference electrode, it is unlikely that the poisoning substance reaches the reference electrode.

In the sensor element of the present invention, the reference gas introducing layer may be provided from the reference electrode to an end surface of the layered body in a longitudinal direction, and the inlet portion may be a portion of the reference gas introducing layer exposed to the end surface.

In the sensor element of the present invention, the one or more gas flowing spaces have a total minimum sectional area Smin of not smaller than 0.0001 mm$^2$, the total minimum sectional area Smin being a total of minimum sectional areas each perpendicular to the direction in which the reference gas is flowed. Accordingly, it is likely that an effect of preventing the oxygen concentration in the periphery of the reference electrode from being excessively high become sufficient.

A gas sensor of the present invention includes the sensor element having any one of the above configurations. Accordingly, the gas sensor has an effect similar to the effect of the above-described sensor element of the present invention, that is, for example, an effect of suppressing a decrease in the detection accuracy of the specific gas concentration.

The gas sensor of the present invention may further include a detecting device that detects the specific gas concentration in the measurement-object gas on the basis of an electromotive force generated between the reference electrode and the measurement electrode; and a reference gas regulating device that flows control current between the reference electrode and the measurement-object gas side electrode to pump in oxygen to the periphery of the reference electrode.

In the sensor element of the present invention, the measurement-object gas side electrode may be provided on the outer surface of the layered body. In the gas sensor of the present invention, the sensor element may include an outer electrode provided on the outer surface of the layered body. In addition, the detecting device may pump in or pump out oxygen via the measurement electrode and the outer electrode on the basis of the electromotive force generated between the reference electrode and the measurement electrode and may detect the specific gas concentration in the measurement-object gas on the basis of the current at the time of pumping in or pumping out. In this case, the outer electrode may serve as the measurement-object gas side electrode.

BRIEF DESCRIPTION OF THE DRAWINGS

FIG. 6 is a sectional view of a gas flowing space 49 according to a modification.

FIG. 7 is a sectional view of the gas flowing space 49 according to a modification.

DETAILED DESCRIPTION OF THE INVENTION

Figure 1:
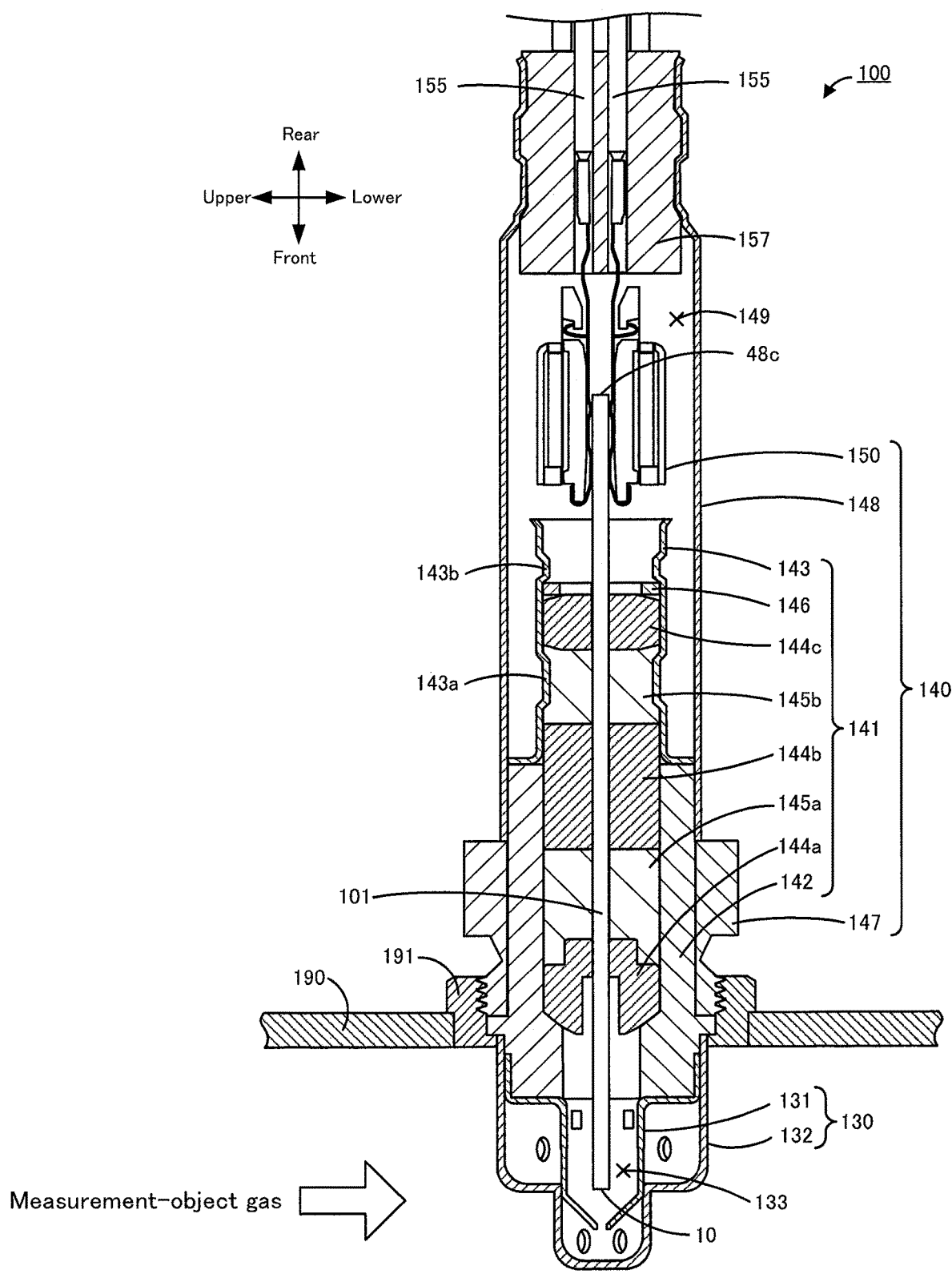
FIG. 1 is a vertical sectional view of a gas sensor 100.
Figure 2:
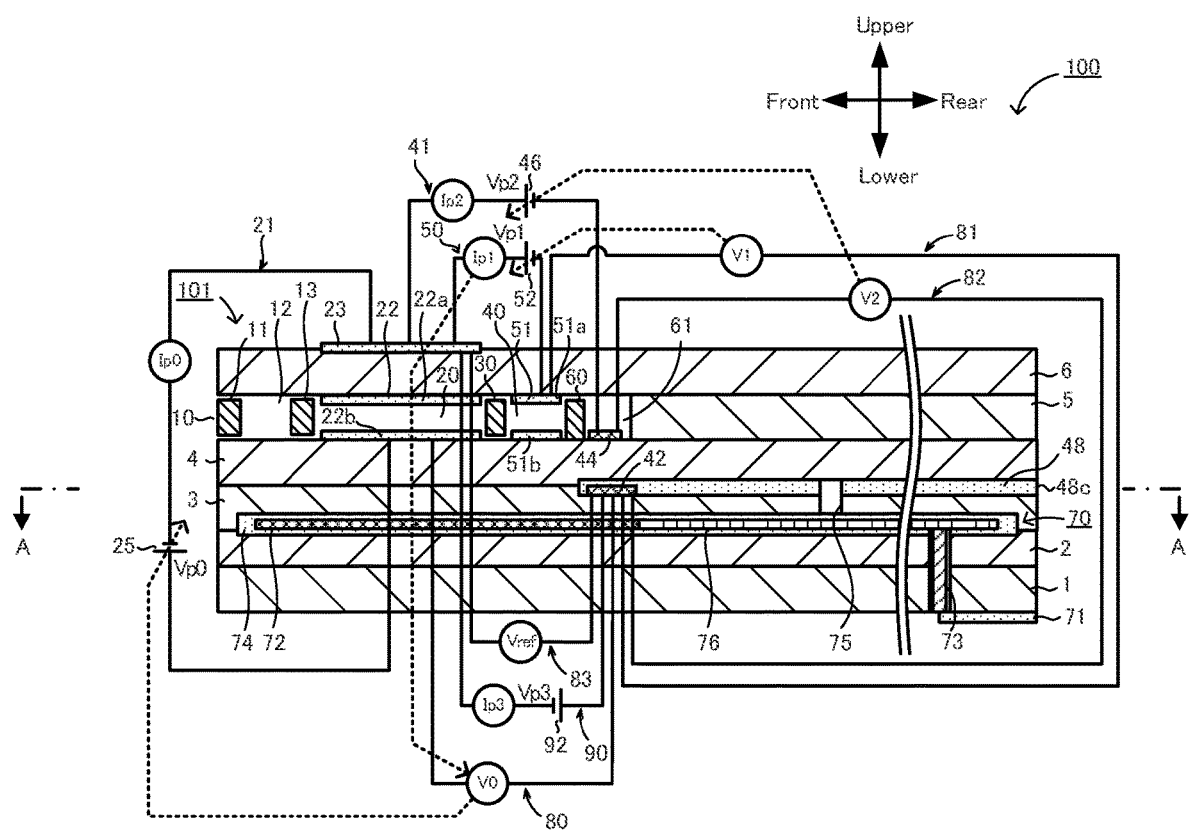
FIG. 2 is a sectional schematic diagram schematically illustrating an example of a configuration of a sensor element 101.
Figure 3:
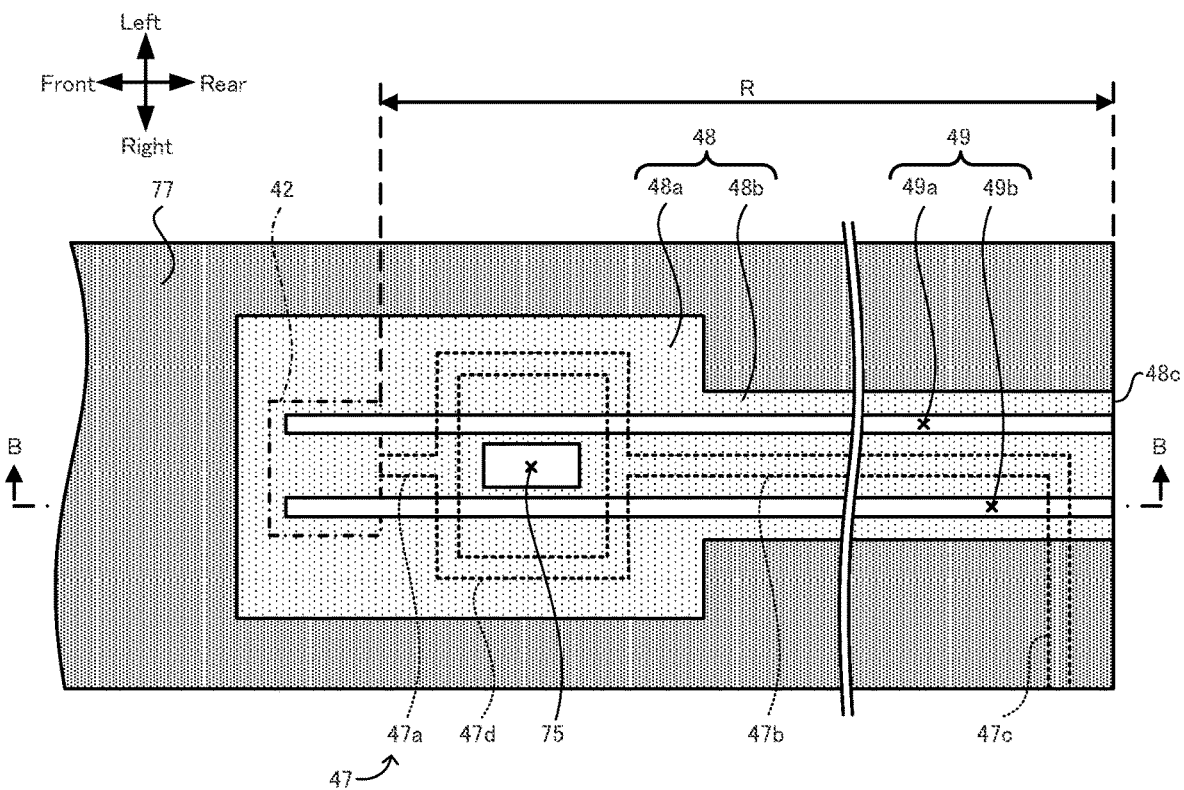
FIG. 3 is an A-A sectional view of FIG. 2.
Figure 4:
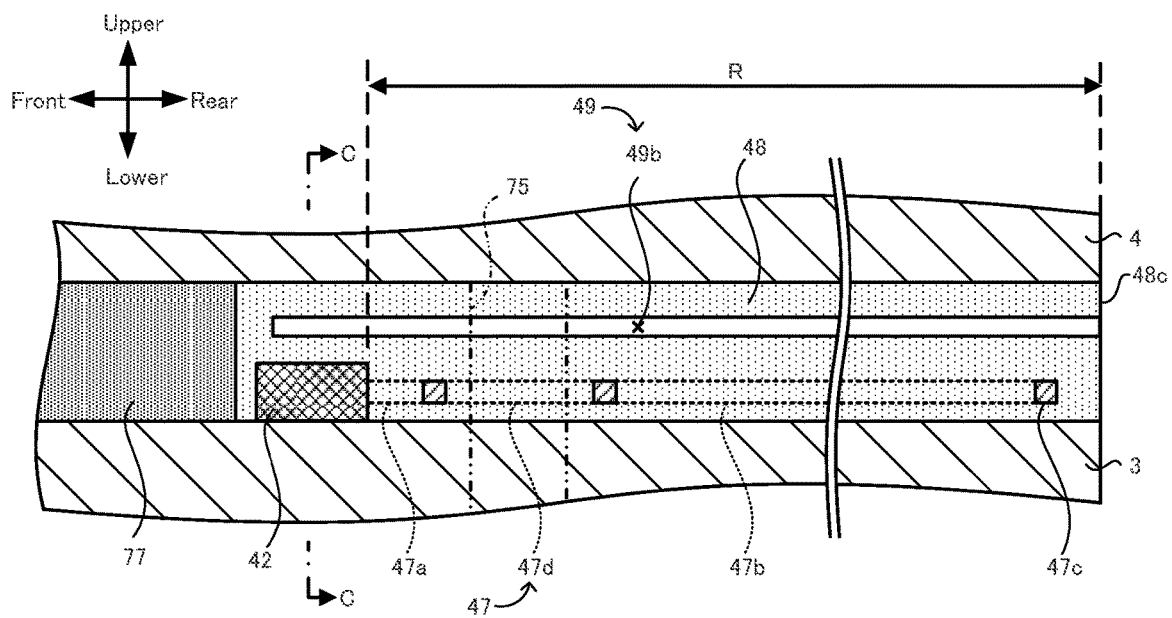
FIG. 4 is a B-B sectional view of FIG. 3.
Figure 5:
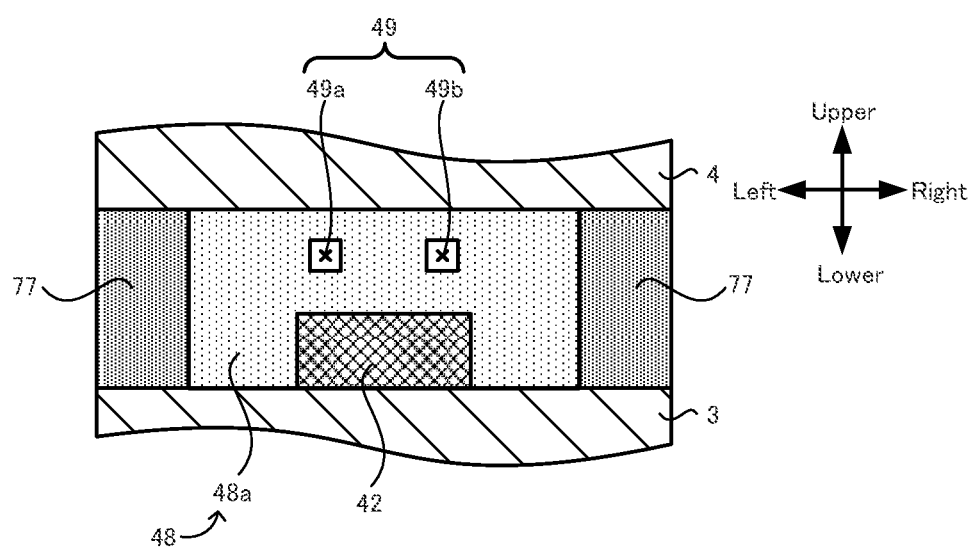
FIG. 5 is a C-C sectional view of FIG. 4.

Next, an embodiment of the present invention will be described with reference to the drawings. FIG. 1 is a vertical sectional view of a gas sensor 100, which is an embodiment of the present invention. FIG. 2 is a sectional schematic diagram schematically illustrating an example of a configuration of a sensor element 101 included in the gas sensor 100. FIG. 3 is an A-A sectional view of FIG. 2, FIG. 4 is a B-B sectional view of FIG. 3, and FIG. 5 is a C-C sectional view of FIG. 4. The sensor element 101 is in a long rectangular parallelepiped shape. A longitudinal direction of the sensor element 101 (left-right direction in FIG. 2) is a front-rear direction, and a thickness direction of the sensor element 101 (vertical direction in FIG. 2) is a vertical direction. A width direction of the sensor element 101 (direction perpendicular to the front-rear direction and the vertical direction) is a left-right direction.

As illustrated in FIG. 1, the gas sensor 100 has the sensor element 101, a protective cover 130 configured to protect a front end side of the sensor element 101, and a sensor assembly 140 including a connector 150 that has continuity with the sensor element 101. This gas sensor 100 is mounted to, for example, a piping 190 such as an exhaust gas pipe of a vehicle as illustrated and is used to measure a specific gas concentration such as NOx or $O_2$ included in an exhaust gas which is a measurement-object gas. According to this embodiment, the gas sensor 100 is used to measure the NOx concentration as the specific gas concentration.

The protective cover 130 includes an inner protective cover 131 in a bottomed cylindrical shape to cover a front end of the sensor element 101 and an outer protective cover 132 in a bottomed cylindrical shape to cover the inner protective cover 131. The inner protective cover 131 and the outer protective cover 132 have a plurality of holes formed to flow the measurement-object gas inside of the protective cover 130. A sensor element chamber 133 is formed as a space surrounded by the inner protective cover 131. The front end of the sensor element 101 is placed in the sensor element chamber 133.

The sensor assembly 140 includes an element sealed body 141 in which the sensor element 101 is sealed and fixed, a nut 147 mounted to the element sealed body 141, an outer cylinder 148, and the connector 150 that is in contact with and is electrically connected with not shown connector electrodes (only a heater connector electrode 71, which will be described later, is shown in FIG. 2) formed on surfaces (upper and lower surfaces) at a rear end of the sensor element 101.

The element sealed body 141 includes a main fitting 142 in a cylindrical shape, an inner cylinder 143 in a cylindrical shape coaxially welded and fixed to the main fitting 142, ceramic supporters 144a to 144c sealed in through holes inside of the main fitting 142 and the inner cylinder 143, green compacts 145a and 145b, and a metal ring 146. The sensor element 101 is located on a center axis of the element sealed body 141 to pass through the element sealed body 141 in the front-rear direction. The inner cylinder 143 has a reduced diameter portion 143a formed to press the green compact 145b in a direction of the center axis of the inner cylinder 143, and a reduced diameter portion 143b formed to press forward the ceramic supporters 144a to 144c and the green compacts 145a and 145b via the metal ring 146. The pressing force from the reduced diameter portions 143a and 143b causes the green compacts 145a and 145b to be compressed between the main fitting 142 or the inner cylinder 143 and the sensor element 101. The green compacts 145a and 145b accordingly seal the sensor element chamber 133 in the protective cover 130 from a space 149 in the outer cylinder 148, while fixing the sensor element 101.

The nut 147 is coaxially fixed to the main fitting 142 and has a male threaded portion formed on its outer peripheral surface. The male threaded portion of the nut 147 is inserted into a fixation member 191 that is welded to the piping 190 and is formed to have a female threaded portion on its inner peripheral surface. The gas sensor 100 is accordingly fixed to the piping 190 in a state in which the front end of the sensor element 101 and the protective cover 130 of the gas sensor 100 are protruded into the piping 190.

The outer cylinder 148 is provided to cover a periphery of the inner cylinder 143, the sensor element 101, and the connector 150. A plurality of lead wires 155 connected with the connector 150 are drawn outside from a rear end of the outer cylinder 148. The lead wires 155 are electrically connected with respective electrodes (described later) of the sensor element 101 via the connector 150. A clearance between the outer cylinder 148 and the lead wires 155 is sealed by a rubber plug 157. The space 149 in the outer cylinder 148 is filled with a reference gas (the air in the embodiment). The rear end of the sensor element 101 is placed in the space 149.

The sensor element 101 is an element of a layered body in which six layers, respectively made of an oxygen ion-conductive solid electrolyte such as zirconia ($ZrO_2$), including a first substrate layer 1, a second substrate layer 2, a third substrate layer 3, a first solid electrolyte layer 4, a spacer layer 5, and a second solid electrolyte layer 6 are stacked in this sequence from a lower side of the drawing. The solid electrolyte forming these six layers is dense and air-tight. The sensor element 101 of this configuration may be manufactured, for example, by making ceramic green sheets corresponding to the respective layers subjected to, for example, predetermined processing and printing of a circuit pattern, stacking the processed green sheets, and firing the stacked green sheets to be integrated.

A gas inlet port 10, a first diffusion controlling portion 11, a buffer space 12, a second diffusion controlling portion 13, a first internal cavity 20, a third diffusion controlling portion 30, a second internal cavity 40, a fourth diffusion controlling portion 60, and a third internal cavity 61 are formed to be adjacent to one another and communicate with one another in this sequence on one end (left end in FIG. 2) of the sensor element 101 and between a lower surface of the second solid electrolyte layer 6 and an upper surface of the first solid electrolyte layer 4.

The gas inlet port 10, the buffer space 12, the first internal cavity 20, the second internal cavity 40, and the third internal cavity 61 are formed as internal spaces of the sensor element 101 by cutting out the spacer layer 5 to have an upper portion defined by the lower surface of the second solid electrolyte layer 6, a lower portion defined by the upper surface of the first solid electrolyte layer 4, and a side portion defined by a side surface of the spacer layer 5.

Each of the first diffusion controlling portion 11, the second diffusion controlling portion 13, and the third diffusion controlling portion 30 is provided in the form of two horizontally long slits (where a longitudinal direction of their openings is a direction perpendicular to the sheet surface). The fourth diffusion controlling portion 60 is provided in the form of one horizontally long slit (where a longitudinal direction of their openings is a direction perpendicular to the sheet surface) that is formed as a clearance from the lower surface of the second solid electrolyte layer 6. A region from the gas inlet port 10 to the third internal cavity 61 is also called a measurement-object gas flowing portion.

An air introducing layer 48 is provided between an upper surface of the third substrate layer 3 and a lower surface of the first solid electrolyte layer 4. The air introducing layer 48 is, for example, made of a ceramic porous material such as alumina. The air introducing layer 48 has a rear end surface serving as an inlet portion 48c, and the inlet portion 48c is exposed to the rear end surface of the sensor element 101. The inlet portion 48c is exposed to the space 149 illustrated in FIG. 1 (see FIG. 1). The reference gas for measuring the NOx concentration is introduced through the inlet portion 48c into the air introducing layer 48. The reference gas is the air (atmosphere in the space 149 in FIG. 1) in this embodiment. In addition, the air introducing layer 48 is formed to cover a reference electrode 42. The air introducing layer 48 applies a predetermined diffusion resistance to the reference gas introduced from the inlet portion 48c and introduces the resistance-applied reference gas into the reference electrode 42.

The reference electrode 42 is an electrode formed between the upper surface of the third substrate layer 3 and the first solid electrolyte layer 4. The air introducing layer 48 is provided in the periphery of the reference electrode 42 as described above. The reference electrode 42 is formed directly on the upper surface of the third substrate layer 3, and a remaining part of the reference electrode 42 other than the part in contact with the upper surface of the third substrate layer 3 is covered by the air introducing layer 48. However, at least a part of the reference electrode 42 has to be covered by the air introducing layer 48. In addition, as will be described later, the oxygen concentrations (oxygen partial pressures) in the first internal cavity 20, in the second internal cavity 40, and in the third internal cavity 61 are measurable by using the reference electrode 42. The reference electrode 42 is formed as a porous cermet electrode (for example, cermet electrode of Pt and $ZrO_2$). The length in the front-rear direction, the width in the left-right direction, and the thickness of the reference electrode 42 are not specifically limited, but the length in the front-rear direction may be, for example, 0.2 to 2 mm, the width in the left-right direction may be, for example, 0.2 to 2.5 mm, and the thickness may be, for example, 5 to 30 µm.

In the measurement-object gas flowing portion, the gas inlet port 10 is a region open to an external space and is arranged such that the measurement-object gas is taken from the external space through the gas inlet port 10 into the sensor element 101. The first diffusion controlling portion 11 is a region that applies a predetermined diffusion resistance to the measurement-object gas taken from the gas inlet port 10. The buffer space 12 is a space provided to lead the measurement-object gas that is introduced from the first diffusion controlling portion 11, to the second diffusion controlling portion 13. The second diffusion controlling portion 13 is a region that applies a predetermined diffusion resistance to the measurement-object gas that is introduced from the buffer space 12 into the first internal cavity 20. In the course of introducing the measurement-object gas from outside of the sensor element 101 into the first internal cavity 20, the measurement-object gas rapidly taken from the gas inlet port 10 into the sensor element 101 by a pressure variation of the measurement-object gas in the external space (pulsation of exhaust gas pressure in a case in which the measurement-object gas is an exhaust gas of an automobile) is not directly introduced into the first internal cavity 20 but is introduced into the first internal cavity 20 after cancellation of a concentration variation of the measurement-object gas through the first diffusion controlling portion 11, the buffer space 12, and the second diffusion controlling portion 13. This reduces the concentration variation of the measurement-object gas introduced into the first internal cavity 20 to a substantially negligible level. The first internal cavity 20 is provided as a space to regulate the oxygen partial pressure in the measurement-object gas introduced through the second diffusion controlling portion 13. The oxygen partial pressure is regulated by operation of a main pump cell 21.

The main pump cell 21 is an electrochemical pump cell, which includes an inner pump electrode 22 having a top electrode portion 22a provided over a substantially entire lower surface of the second solid electrolyte layer 6 facing the first internal cavity 20, an outer pump electrode 23 provided in a region corresponding to the top electrode portion 22a on an upper surface of the second solid electrolyte layer 6 to be exposed to an external space (sensor element chamber 133 in FIG. 1), and the second solid electrolyte layer 6 placed between these electrodes 22 and 23.

The inner pump electrode 22 is formed across the upper and lower solid electrolyte layers (the second solid electrolyte layer 6 and the first solid electrolyte layer 4) defining the first internal cavity 20 and the spacer layer 5 forming the side wall. Specifically, the top electrode portion 22a is formed on the lower surface of the second solid electrolyte layer 6 that forms a top surface of the first internal cavity 20. A bottom electrode portion 22b is formed directly on the upper surface of the first solid electrolyte layer 4 that forms a bottom surface of the first internal cavity 20. Side electrode portions (omitted from illustrations) are formed on side wall surfaces (inner surfaces) of the spacer layer 5 that form both side wall portions of the first internal cavity 20, such as to connect the top electrode portion 22a with the bottom electrode portion 22b and provide a tunnel-like structure in the region where the side electrode portions are provided.

The inner pump electrode 22 and the outer pump electrode 23 are formed as porous cermet electrodes (for example, cermet electrodes of Pt and $ZrO_2$ containing 1% Au). The inner pump electrode 22 in contact with the measurement-object gas is made of a material having the decreased reducing ability with regard to the NOx component in the measurement-object gas.

The main pump cell 21 is capable of pumping out oxygen from the first internal cavity 20 to the external space or pumping in oxygen from the external space to the first internal cavity 20 by applying a desired pump voltage Vp0 between the inner pump electrode 22 and the outer pump electrode 23 and making a pump current Ip0 flow in a positive direction or a negative direction between the inner pump electrode 22 and the outer pump electrode 23.

In order to detect the oxygen concentration (oxygen partial pressure) in the atmosphere of the first internal cavity 20, the inner pump electrode 22, the second solid electrolyte layer 6, the spacer layer 5, the first solid electrolyte layer 4, the third substrate layer 3, and the reference electrode 42 constitute an electrochemical sensor cell, that is, a main pump-controlling oxygen partial pressure detection sensor cell 80.

The oxygen concentration (oxygen partial pressure) in the first internal cavity 20 is determined by measuring an electromotive force V0 in the main pump-controlling oxygen partial pressure detection sensor cell 80. The pump current Ip0 is controlled by feedback control of the pump voltage Vp0 of a variable power supply 25 to keep the electromotive force V0 constant. This maintains the oxygen concentration in the first internal cavity 20 at a predetermined constant value.

The third diffusion controlling portion 30 is a region that applies a predetermined diffusion resistance to the measurement-object gas with the oxygen concentration (oxygen partial pressure) controlled by operation of the main pump cell 21 in the first internal cavity 20 and leads the resistance-applied measurement-object gas to the second internal cavity 40.

The second internal cavity 40 is provided as a space to further regulate the oxygen partial pressure by means of an auxiliary pump cell 50 with respect to the measurement-object gas introduced through the third diffusion controlling portion 30 after regulation of the oxygen concentration (oxygen partial pressure) in the first internal cavity 20. This maintains the oxygen concentration in the second internal cavity 40 constant with high accuracy and thus enables the gas sensor 100 to measure the NOx concentration with high accuracy.

The auxiliary pump cell 50 is an auxiliary electrochemical pump cell, which includes an auxiliary pump electrode 51 having a top electrode portion 51a provided over a substantially entire lower surface of the second solid electrolyte layer 6 facing the second internal cavity 40, the outer pump electrode 23 (or any appropriate electrode outside of the sensor element 101 in place of the outer pump electrode 23), and the second solid electrolyte layer 6.

The auxiliary pump electrode 51 is provided to have a tunnel-like structure like the inner pump electrode 22 provided in the first internal cavity 20 and is placed in the second internal cavity 40. That is, the top electrode portion 51a is formed on the second solid electrolyte layer 6 that forms a top surface of the second internal cavity 40. A bottom electrode portion 51b is formed directly on the upper surface of the first solid electrolyte layer 4 that forms a bottom surface of the second internal cavity 40. Side electrode portions (omitted from illustrations) are formed on side wall surfaces of the spacer layer 5 that form side walls of the second internal cavity 40, such as to connect the top electrode portion 51a with the bottom electrode portion 51b and provide a tunnel-like structure. Like the inner pump electrode 22, the auxiliary pump electrode 51 is made of a material having the decreased reducing ability with regard to the NOx component in the measurement-object gas.

The auxiliary pump cell 50 is capable of pumping out oxygen in the atmosphere from the second internal cavity 40 to the external space or pumping in oxygen from the external space to the second internal cavity 40 by applying a desired voltage Vp1 between the auxiliary pump electrode 51 and the outer pump electrode 23.

In order to control the oxygen partial pressure in the atmosphere of the second internal cavity 40, the auxiliary pump electrode 51, the reference electrode 42, the second solid electrolyte layer 6, the spacer layer 5, the first solid electrolyte layer 4 and the third substrate layer 3 constitute an electrochemical sensor cell, that is, an auxiliary pump-controlling oxygen partial pressure detection sensor cell 81.

The auxiliary pump cell 50 performs pumping at a variable power supply 52 under voltage control based on an electromotive force V1 detected by the auxiliary pump-controlling oxygen partial pressure detection sensor cell 81. This controls the oxygen partial pressure in the atmosphere of the second internal cavity 40 to such a low partial pressure that substantially does not affect the measurement of NOx.

Additionally, its pump current Ip1 is used to control the electromotive force of the main pump-controlling oxygen partial pressure detection sensor cell 80. Specifically, the pump current Ip1 is input as a control signal into the main pump-controlling oxygen partial pressure detection sensor cell 80 to control its electromotive force V0. This control maintains a constant slope of the oxygen partial pressure in the measurement-object gas that is introduced from the third diffusion controlling portion 30 into the second internal cavity 40. In a case in which the gas sensor 100 is used as a NOx sensor, the oxygen concentration in the second internal cavity 40 is maintained at a constant level of approximately 0.001 ppm by the operation of the main pump cell 21 and the auxiliary pump cell 50.

The fourth diffusion controlling portion 60 is a region that applies a predetermined diffusion resistance to the measurement-object gas with the oxygen concentration (oxygen partial pressure) controlled by operation of the auxiliary pump cell 50 in the second internal cavity 40 and leads the resistance-applied measurement-object gas to the third internal cavity 61. The fourth diffusion controlling portion 60 serves to limit the amount of NOx flowing into the third internal cavity 61.

The third internal cavity 61 is provided as a space to further perform a process on the measurement-object gas introduced through the fourth diffusion controlling portion 60 after regulation of the oxygen concentration (oxygen partial pressure) in the second internal cavity 40, the process being related to measurement of the concentration of nitrogen oxides (NOx) in the measurement-object gas. Measurement of the NOx concentration is mainly performed in the third internal cavity 61 by operation of a measurement pump cell 41.

The measurement pump cell 41 measures the NOx concentration in the measurement-object gas in the third internal cavity 61. The measurement pump cell 41 is an electrochemical pump cell, which includes a measurement electrode 44 provided directly on an upper surface of the first solid electrolyte layer 4 facing the third internal cavity 61, the outer pump electrode 23, the second solid electrolyte layer 6, the spacer layer 5, and the first solid electrolyte layer 4. The measurement electrode 44 is a porous cermet electrode. The measurement electrode 44 also serves as a NOx reducing catalyst to reduce NOx present in the atmosphere of the third internal cavity 61.

The measurement pump cell 41 is capable of pumping out oxygen produced by degradation of nitrogen oxides in the ambient atmosphere of the measurement electrode 44 and detecting the production amount of oxygen as a pump current Ip2.

In order to detect the oxygen partial pressure in the periphery of the measurement electrode 44, the first solid electrolyte layer 4, the third substrate layer 3, the measurement electrode 44, and the reference electrode 42 constitute an electrochemical sensor cell, that is, a measurement pump-controlling oxygen partial pressure detection sensor cell 82. A variable power supply 46 is controlled on the basis of an electromotive force V2 detected by the measurement pump-controlling oxygen partial pressure detection sensor cell 82.

The measurement-object gas introduced into the second internal cavity 40 passes through the fourth diffusion controlling portion 60 with the oxygen partial pressure controlled and reaches the measurement electrode 44 in the third internal cavity 61. Nitrogen oxides in the measurement-object gas in the periphery of the measurement electrode 44 are reduced to produce oxygen (2NO→N$_2$+O$_2$). The produced oxygen is subjected to pumping by the measurement pump cell 41. In this process, a voltage Vp2 of the variable power supply 46 is controlled to maintain constant the electromotive force V2 detected by the measurement pump-controlling oxygen partial pressure detection sensor cell 82. Since the amount of oxygen produced in the periphery of the measurement electrode 44 is proportional to the concentration of nitrogen oxides in the measurement-object gas, the concentration of nitrogen oxides in the measurement-object gas is calculated by using the pump current Ip2 of the measurement pump cell 41.

The second solid electrolyte layer 6, the spacer layer 5, the first solid electrolyte layer 4, the third substrate layer 3, the outer pump electrode 23, and the reference electrode 42 constitute an electrochemical sensor cell 83. The oxygen partial pressure in the measurement-object gas outside of the sensor is detectable by using an electromotive force Vref obtained by this sensor cell 83.

Additionally, the second solid electrolyte layer 6, the spacer layer 5, the first solid electrolyte layer 4, the third substrate layer 3, the outer pump electrode 23, and the reference electrode 42 constitute an electrochemical reference gas regulation pump cell 90. The reference gas regulation pump cell 90 performs pumping by means of a control current Ip3 flowed by using a voltage Vp3 applied by a variable power supply 92 connected between the outer pump electrode 23 and the reference electrode 42. The reference gas regulation pump cell 90 accordingly pumps in oxygen from an ambient space of the outer pump electrode 23 (sensor element chamber 133 in FIG. 1) to an ambient space of the reference electrode 42 (air introducing layer 48). The voltage Vp3 of the variable power supply 92 is predetermined as a direct-current voltage by which the control current Ip3 has a predetermined value (direct current at a constant value).

In the gas sensor 100 having the above configuration, the measurement pump cell 41 receives the measurement-object gas with the oxygen partial pressure maintained at a constant low value (value that does not substantially affect the measurement of NOx) by the operation of the main pump cell 21 and the auxiliary pump cell 50. Accordingly, the NOx concentration in the measurement-object gas is determinable, on the basis of the pump current Ip2 flowed by the measurement pump cell 41 pumping out oxygen produced by reduction of NOx approximately in proportion to the concentration of NOx in the measurement-object gas.

Additionally, the sensor element 101 is provided with a heater unit 70 serving to adjust a temperature to heat the sensor element 101 and keep the sensor element 101 warm, in order to enhance the oxygen ion conductivity of the solid electrolyte. The heater unit 70 includes a heater connector electrode 71, a heater 72, a through hole 73, a heater insulating layer 74, a pressure release hole 75, and a lead wire 76.

The heater connector electrode 71 is an electrode formed to be in contact with a lower surface of the first substrate layer 1. Connecting the heater connector electrode 71 with an external power supply allows for external power feeding to the heater unit 70.

The heater 72 is an electric resistor formed to be placed between the second substrate layer 2 and the third substrate layer 3. The heater 72 is connected with the heater connector electrode 71 via the lead wire 76 and the through hole 73 and generates heat by external power feeding through the heater connector electrode 71 to heat the solid electrolyte included in the sensor element 101 and keep the solid electrolyte warm.

The heater 72 is embedded over an entire area from the first internal cavity 20 to the third internal cavity 61 and is capable of adjusting the entire sensor element 101 to a temperature at which the solid electrolyte is activated.

The heater insulating layer 74 is an insulating layer of porous alumina formed from an insulating material such as alumina on upper and lower surfaces of the heater 72. The heater insulating layer 74 is formed to provide electrical insulation between the second substrate layer 2 and the heater 72 and electrical insulation between the third substrate layer 3 and the heater 72.

The pressure release hole 75 is a region provided to pass through the third substrate layer 3 and the air introducing layer 48 and is formed to relieve an increase in internal pressure accompanied with a temperature rise in the heater insulating layer 74.

The variable power supplies 25, 46, 52, and 92 illustrated in FIG. 2 and the like are actually connected with the respective electrodes via not shown lead wires (only a reference electrode lead 47 that will be described later is illustrated in FIGS. 3 and 4) formed in the sensor element 101 and the connector 150 and the lead wires 155 illustrated in FIG. 1.

Now, configurations of the air introducing layer 48 and its periphery will be described in detail with reference to FIGS. 3 to 5. As illustrated in FIGS. 3 to 5, the reference electrode 42, the reference electrode lead 47, the air introducing layer 48, a pressure release hole 75, and an adhesive layer 77 are provided between an upper surface of the third substrate layer 3 and a lower surface of the first solid electrolyte layer 4.

The reference electrode lead 47 includes first to third linear portions 47a to 47c and a detour portion 47d. The first linear portion 47a is provided to be connected to a rear end of the reference electrode 42 and to extend in the front-rear direction. The detour portion 47d is provided to be connected to a rear end of the first linear portion 47a and to detour the pressure release hole 75 with left and right portions in parallel. The second linear portion 47b is provided to be connected to a joining portion at a rear end of the detour portion 47d to extend in the front-rear direction to the vicinity of a rear end of the sensor element 101. The third linear portion 47c is provided to be connected to a rear end of the second linear portion 47b and to extend in the left-right direction to reach a right side surface of the sensor element 101. A right end portion of the third linear portion 47c is connected to a connector electrode (not shown) on an upper surface or lower surface of the sensor element 101 via a lead wire (not shown) or the like provided on the right side surface of the sensor element 101. Power can be externally supplied to the reference electrode 42 or the voltage or current of the reference electrode 42 is measurable via the connector electrode. The periphery of the reference electrode lead 47 is covered by the air introducing layer 48, and the air introducing layer 48 is also present between the upper surface of the third substrate layer 3 and a lower surface of the reference electrode lead 47.

The air introducing layer 48 is provided from the reference electrode 42 to an end surface (rear end surface in this embodiment) of the sensor element 101 in the longitudinal direction (front-rear direction in this embodiment). The air introducing layer 48 includes a wide portion 48a, a narrow portion 48b having a smaller width in the left-right direction than the wide portion 48a, and a gas flowing space 49. The wide portion 48a covers the reference electrode 42, and the pressure release hole 75 also passes through the wide portion 48a in the vertical direction. The wide portion 48a is formed to be wide so as to cover the detour portion 47d of the reference electrode lead 47. The narrow portion 48b is connected to the wide portion 48a in the front-rear direction and is located behind the wide portion 48a. A rear end portion of the narrow portion 48b serves as the above-described inlet portion 48c. Accordingly, a reference gas is introduced from the inlet portion 48c and passes through the narrow portion 48b and the wide portion 48a in this sequence to reach the reference electrode 42. The air introducing layer 48 also serves as an insulating layer that insulates the reference electrode lead 47 from the third substrate layer 3 and the first solid electrolyte layer 4. As illustrated in FIG. 3, a part of the third linear portion 47c is protruded to the right side from the narrow portion 48b, and this part is not covered by the air introducing layer 48. This part may be insulated by another insulating layer (not shown) from the third substrate layer 3 and the first solid electrolyte layer 4. The air introducing layer 48 may have a thickness of 10 m or more and 30 µm or less, but this is not restrictive. The air introducing layer 48 may have a porosity of 10 volume % or more and 50 volume % or less.

The gas flowing space 49 is a space in which the reference gas introduced from the inlet portion 48c and a gas such as oxygen that is pumped in to the periphery of the reference electrode 42 by the reference gas regulation pump cell 90 can flow. The gas flowing space 49 includes one or more spaces. In this embodiment, the gas flowing space 49 includes two spaces: a first gas flowing space 49a and a second gas flowing space 49b that is placed on the right side of the first gas flowing space 49a. The first and second gas flowing spaces 49a and 49b are each a space extending in the front-rear direction. Each of the first and second gas flowing spaces 49a and 49b is provided over a region (region R in FIGS. 3 and 4) from the inlet portion 48c to the reference electrode 42 (rear end of the reference electrode 42 in this embodiment) in a reference gas flowing direction (front-rear direction in this embodiment) from the inlet portion 48c to the reference electrode 42. Note that the length of the region R in the reference gas flowing direction (front-rear direction in this embodiment) is the shortest distance between the inlet portion 48c and the reference electrode 42 along the reference gas flowing direction. In this embodiment, the first and second gas flowing spaces 49a and 49b are each provided not only in the region R but also in a region from a front end of the region R toward (ahead of) the reference electrode 42. Thus, the gas flowing space 49 is also present above the reference electrode 42. Note that the gas flowing space 49 is not present to a location of a front end of the reference electrode 42 in the front-rear direction in this embodiment, but this is not restrictive. For example, the gas flowing space 49 may be present ahead of the front end of the reference electrode 42 in the front-rear direction or to a front end of the air introducing layer 48. In addition, since the first and second gas flowing spaces 49a and 49b are each present to the inlet portion 48c in the front-rear direction, the first and second gas flowing spaces 49a and 49b are each open to the space 149 (see FIG. 1). Each of the first and second gas flowing spaces 49a and 49b is preferably separated from the reference electrode 42. That is, the reference electrode 42 is preferably exposed to none of the first and second gas flowing spaces 49a and 49b. In this embodiment, the first and second gas flowing spaces 49a and 49b are each provided at a location separated above from the reference electrode 42. In addition, the first and second gas flowing spaces 49a and 49b are separated from the pressure release hole 75 and do not communicate with the pressure release hole 75.

The gas flowing space 49 preferably has a total minimum sectional area Smin, which is a total of minimum sectional areas perpendicular to the reference gas flowing direction for each of the spaces included in the gas flowing space 49, of not smaller than 0.0001 mm². In this embodiment, a section perpendicular to the reference gas flowing direction is, for example, a section that is parallel to the up-down and left-right directions as illustrated in FIG. 5. In this embodiment, the total minimum sectional area Smin is the total of minimum sectional areas of the first and second gas flowing spaces 49a and 49b. Note that a sectional area of a space (for example, the first gas flowing space 49a) may differ depending on which location along the reference gas flowing direction the section is obtained. Accordingly, the total minimum sectional area Smin is defined as the sum of minimum sectional areas of one or more spaces (the first and second gas flowing spaces 49a and 49b in this embodiment) included in the gas flowing space 49. As the total minimum sectional area Smin is larger, the gas flows in the gas flowing space 49 more easily. Note that the sections of the first and second gas flowing spaces 49a and 49b are rectangular in FIG. 5, but this is not restrictive. The sections of the first and second gas flowing spaces 49a and 49b may be circular or in any other shape.

Note that the adhesive layer 77 is present on the left and right sides of the air introducing layer 48 and ahead of the air introducing layer 48. The adhesive layer 77 adheres the third substrate layer 3 to the first solid electrolyte layer 4. The adhesive layer 77 covers almost all regions between the upper surface of the third substrate layer 3 and the lower surface of the first solid electrolyte layer 4 where the air introducing layer 48 is absent. The adhesive layer 77 may be present, for example, between an upper layer of the air introducing layer 48 and the lower surface of the first solid electrolyte layer 4. The adhesive layer 77 preferably has an oxygen ion conductivity like the layers 1 to 6. In this embodiment, the adhesive layer 77 is made of ceramic containing zirconia as a main component like the layers 1 to 6. Note that an adhesive layer may be provided between the layers 1 to 6 in addition to the adhesive layer between the third substrate layer 3 and the first solid electrolyte layer 4.

The following describes an example of a manufacturing method of the gas sensor 100. First, six unfired ceramic green sheets are prepared, each containing an oxygen ion-conductive solid electrolyte such as zirconia as the ceramic component. A plurality of sheet holes used for positioning in printing or in stacking, a plurality of required through holes, and the like are formed in advance in the respective green sheets. A space forming the measurement-object gas flowing portion is provided in advance by, for example, punching in the green sheet for the spacer layer 5. Subsequently, a pattern printing process and a drying process are performed to form various patterns in the respective ceramic green sheets respectively corresponding to the first substrate layer 1, the second substrate layer 2, the third substrate layer 3, the first solid electrolyte layer 4, the spacer layer 5, and the second solid electrolyte layer 6. Specifically, the patterns formed include, for example, the respective electrodes described above, lead wires connecting with the respective electrodes, the air introducing layer 48, and the heater unit 70. The pattern printing is performed by applying pattern-forming paste provided according to the properties required for each object on the green sheet by a known screen printing technique. The drying process also employs any known drying technique. On completion of pattern printing and drying, the procedure performs a printing and drying process to print and dry an adhesive paste for stacking and bonding the green sheets corresponding to the respective layers. The procedure then performs a press bonding process to position the respective green sheets with the adhesive paste by aligning the sheet holes, stack the respective green sheets in a predetermined sequence, and pressure bond the respective green sheets under predetermined temperature and pressure conditions to form one layered body. The resulting layered body includes a plurality of sensor elements 101. The layered body is cut into the size of the sensor elements 101. Each of the cut-out piece of the layered body is fired at a predetermined firing temperature to provide the sensor element 101.

In the manufacturing method described above, the gas flowing space 49 may be made of a vanishing material (e.g., carbon or theobromine) that is vanished by burning. For example, at the time of forming a pattern corresponding to the air introducing layer 48 on a green sheet serving as the third substrate layer 3, first, a pattern of the air introducing layer 48 in a region between the gas flowing space 49 and the green sheet is formed. Subsequently, the vanishing material is applied and dried on the surface of the formed pattern to form the vanishing material having the shape of the gas flowing space 49. The vanishing material can be applied by, for example, screen printing, photogravure, ink jet printing, or the like. The vanishing material may be formed by repeating application and drying plural times. Subsequently, a pattern corresponding to a remaining region of the air introducing layer 48 is formed. While firing the layered body that is cut out to a size of the sensor element 101 as described above, the vanishing material is vanished by burning. Thus, the part of the vanishing material becomes the gas flowing space 49, and the air introducing layer 48 including the gas flowing space 49 is formed.

After obtaining the sensor element 101, the procedure produces the sensor assembly 140 (see FIG. 1) with the sensor element 101 built therein and mounts the components such as the protective cover 130 and the rubber plug 157 to the sensor assembly 140 to complete the gas sensor 100. This manufacturing method of the gas sensor is known in the art and is described in, for example, WO 2013/005491.

The following describes the functions of the reference gas regulation pump cell 90 in detail. The measurement-object gas is introduced from the sensor element chamber 133 illustrated in FIG. 1 to the measurement-object gas flowing portion of the sensor element 101 including, for example, the gas inlet port 10. The reference gas (air) in the space 149 illustrated in FIG. 1 is, on the other hand, introduced into the air introducing layer 48 of the sensor element 101. The sensor element chamber 133 and the space 149 are separated from each other by the sensor assembly 140 (especially the green compacts 145a and 145b) and are sealed to prevent the gas from flowing therebetween. When the pressure of the measurement-object gas is temporarily increased, however, the measurement-object gas may slightly enter the space 149. This causes temporary reduction of the oxygen concentration in the periphery of the reference electrode 42 and thereby results in changing the reference potential that is the potential of the reference electrode 42. This may change an electromotive force based on the reference electrode 42, for example, the electromotive force V2 of the measurement pump-controlling oxygen partial pressure detection sensor cell 82 and decrease the detection accuracy of the NOx concentration in the measurement-object gas. The reference gas regulation pump cell 90 serves to suppress such a decrease of the detection accuracy. The reference gas regulation pump cell 90 pumps in a constant amount of oxygen from the periphery of the outer pump electrode 23 to the periphery of the reference electrode 42 by the flow of the control current Ip3. As described above, this compensates for reduction of oxygen and suppresses a decrease of the detection accuracy of the NOx concentration when the measurement-object gas has temporarily reduced the oxygen concentration in the periphery of the reference electrode 42.

The value of the control current Ip3 (for example, average) can be determined in advance by experiment or the like on the basis of how much the oxygen concentration in the periphery of the reference electrode 42 is reduced (how much oxygen needs to be pumped in to the periphery of the reference electrode 42) when the pressure of the measurement-object gas is an assumable maximum.

Typically, in a case in which oxygen is pumped in to the periphery of the reference electrode 42 by the reference gas regulation pump cell 90 as in the above case, the oxygen concentration in the periphery of the reference electrode 42 may become excessively high in some cases. For example, in this embodiment, the control current Ip3 is flowed every time the gas sensor 100 detects the NOx concentration regardless of whether or not the measurement-object gas slightly enters the space 149. In this case, even if the oxygen concentration in the reference gas in the periphery of the reference electrode 42 is not reduced, such as when the measurement-object gas has a relatively low pressure and does not enter the space 149, the reference gas regulation pump cell 90 pumps in oxygen to the periphery of the reference electrode 42. If such excessive pumping in is performed, in principle, extra oxygen in the periphery of the reference electrode 42 diffuses through the air introducing layer 48 to the space 149. However, the diffusion resistance of the air introducing layer 48 generates an oxygen concentration gradient along the reference gas flowing direction between the periphery of the reference electrode 42 and the inlet portion 48c in the air introducing layer 48. If the oxygen concentration gradient is sharp, the oxygen concentration in the periphery of the reference electrode 42 is excessively higher than an original oxygen concentration in the reference gas. This changes the potential of the reference electrode 42, resulting in a decrease of the detection accuracy of the NOx concentration. However, the air introducing layer 48 in this embodiment includes the gas flowing space 49. Since a gas flows more easily in the gas flowing space 49 than in the other portion (porous portion) of the air introducing layer 48, at least one of the following is possible: oxygen in the periphery of the reference electrode 42 can immediately reach the inlet portion 48c; and the reference gas can immediately reach the reference electrode 42 from the inlet portion 48c. This makes the above-described oxygen concentration gradient less sharp than in a case in which the gas flowing space 49 is not provided. Thus, since the air introducing layer 48 includes the gas flowing space 49, it is possible to prevent the oxygen concentration in the periphery of the reference electrode 42 from being excessively higher than the original oxygen concentration in the reference gas and to suppress a decrease of the detection accuracy of the NOx concentration.

The following gives the correspondence relationship between the components according to this embodiment and components according to the present invention. The first substrate layer 1, the second substrate layer 2, the third substrate layer 3, the first solid electrolyte layer 4, the spacer layer 5, and the second solid electrolyte layer 6 according to this embodiment correspond to a layered body according to the present invention; the measurement electrode 44 corresponds to a measurement electrode; the outer pump electrode 23 corresponds to a measurement-object gas side electrode; the reference electrode 42 corresponds to a reference electrode; the air introducing layer 48 corresponds to a reference gas introducing layer; and the gas flowing space 49 corresponds to a gas flowing space. The measurement pump cell 41 corresponds to a detecting device, and the reference gas regulation pump cell 90 corresponds to a reference gas regulating device.

In the gas sensor 100 of the embodiment specifically described above, the air introducing layer 48 of the sensor element 101 includes the inlet portion 48c and the gas flowing space 49 provided over the region R from the inlet portion 48c to the reference electrode 42 in the reference gas flowing direction. This can prevent the oxygen concentration in the periphery of the reference electrode 42 from being excessively higher than the original oxygen concentration in the reference gas, and can suppress a decrease of the detection accuracy of the NOx concentration of the sensor element 101.

In addition, the first and second gas flowing spaces 49a and 49b included in the gas flowing space 49 are each separated from the reference electrode 42. For example, if the reference electrode 42 is exposed to the gas flowing space 49 at the time the measurement-object gas enters the air introducing layer 48, a poisoning substance in the measurement-object gas may pass through the gas flowing space 49 to reach the reference electrode 42 in some cases. In contrast, since the first and second gas flowing spaces 49a and 49b are each separated from the reference electrode 42, it is unlikely that the poisoning substance reaches the reference electrode 42.

In addition, the gas flowing space 49 has a total minimum sectional area Smin of not smaller than 0.0001 mm$^2$. Accordingly, it is likely that the above-described effect of preventing the oxygen concentration in the periphery of the reference electrode 42 from being excessively high become sufficient.

The present invention is not limited to the embodiment described above but may be implemented by a diversity of other configurations without departing from the technical scope of the invention.

For example, in the above-described embodiment, the gas flowing space 49 includes two spaces, which are the first and second gas flowing spaces 49a and 49b, but this is not restrictive. The gas flowing space 49 may include one or more spaces. In addition, the first and second gas flowing spaces 49a and 49b are each a linear space in the above-described embodiment, but this is not restrictive. For example, as in the gas flowing space 49 according to a modification illustrated in FIG. 6, the first and second gas flowing spaces 49a and 49b may be in a shape of a zigzag line or may be curved. The gas flowing space 49 is present above the reference electrode 42 in the above-described embodiment, but this is not restrictive. The gas flowing space 49 may be present on the left or right side of the reference electrode 42 (for example, FIG. 6). In addition, as illustrated in FIG. 4, the gas flowing space 49 has a substantially constant distance from the upper surface of the third substrate layer 3 in the vertical direction in the above-described embodiment, but this is not restrictive.

Although the gas flowing space 49 in the above-described embodiment does not communicate with the pressure release hole 75, the gas flowing space 49 may communicate with the pressure release hole 75. FIG. 7 is a sectional view of the gas flowing space 49 according to a modification of this case. The gas flowing space 49 in FIG. 7 is a single space formed in the center of the sensor element 101 in the left-right direction and communicates with the pressure release hole 75. Note that the pressure release hole 75 is included in the gas flowing space 49 in this case.

Figure 8:
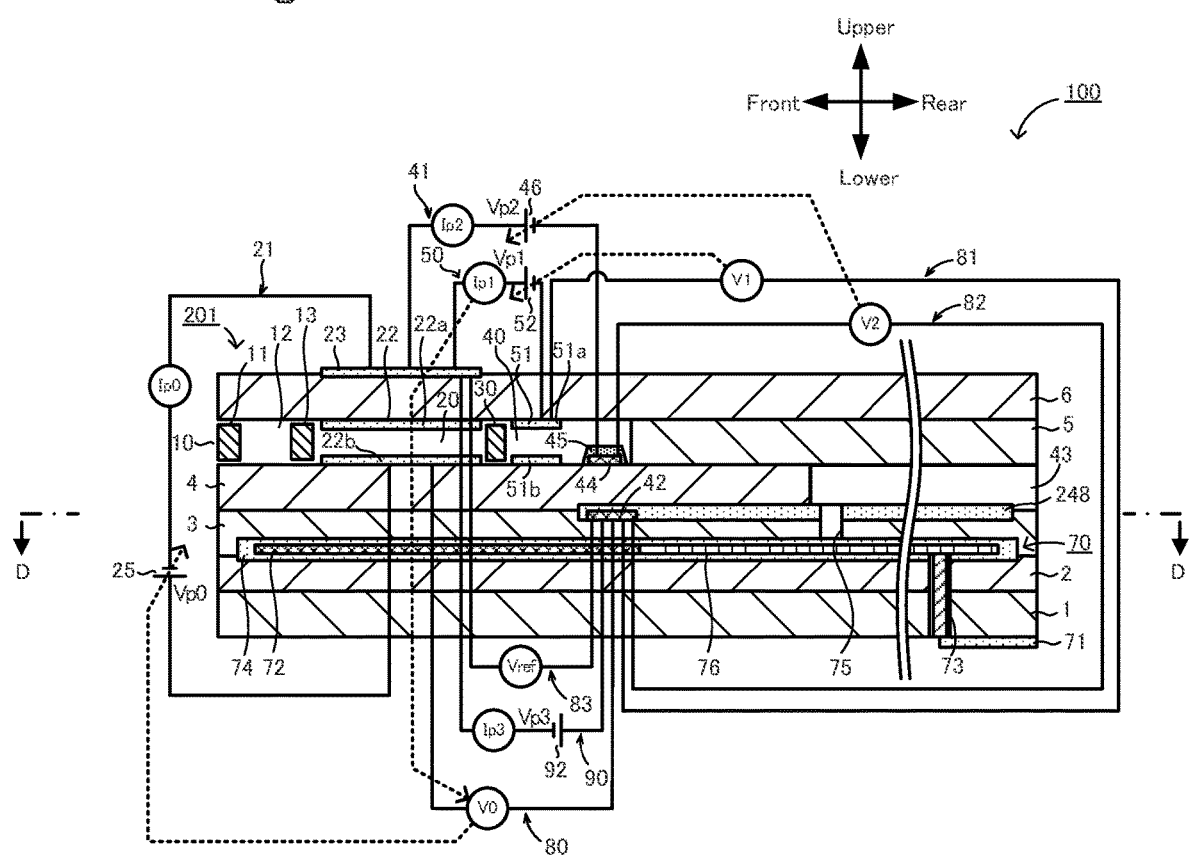
FIG. 8 is a sectional schematic diagram of a sensor element 201 according to a modification.
Figure 9:
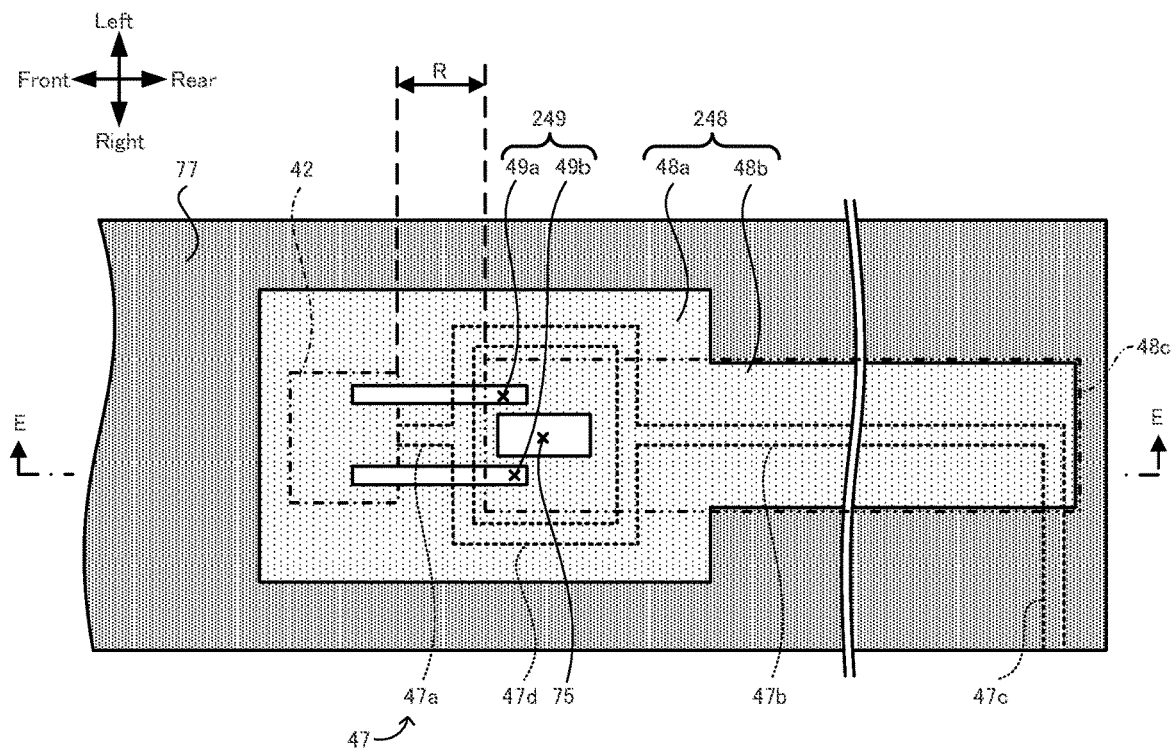
FIG. 9 is a D-D sectional view of FIG. 8.
Figure 10:
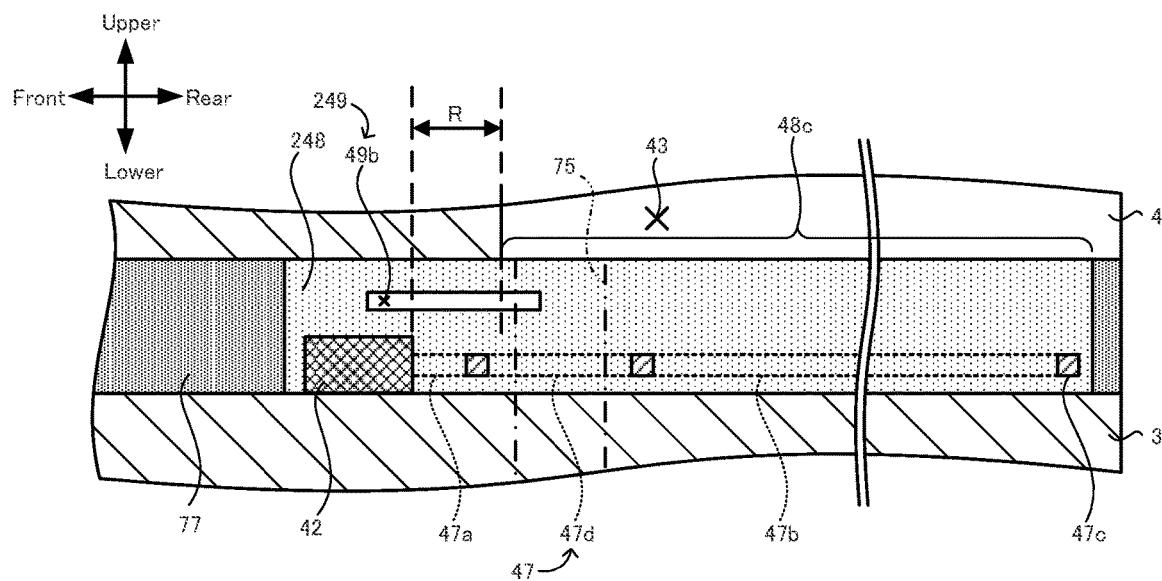
FIG. 10 is an E-E sectional view of FIG. 9.

The air introducing layer 48 is provided from the reference electrode 42 to the rear end surface of the sensor element 101 in the longitudinal direction in the above-described embodiment, but this is not restrictive. FIG. 8 is a sectional schematic diagram of a sensor element 201 according to a modification of this case. FIG. 9 is a D-D sectional view of FIG. 8. FIG. 10 is an E-E sectional view of FIG. 9. As illustrated in FIG. 8, the sensor element 201 includes a reference gas introducing space 43 above an air introducing layer 248. The reference gas introducing space 43 is a space provided between an upper surface of the third substrate layer 3 and a lower surface of the spacer layer 5. Also, side portions of the reference gas introducing space 43 are defined by side surfaces of the first solid electrolyte layer 4. A rear end of the reference gas introducing space 43 is open to a rear end surface of the sensor element 201. The reference gas introducing space 43 is provided to be ahead of the pressure release hole 75 in the front-rear direction, and the pressure release hole 75 is open to the reference gas introducing space 43. Unlike the air introducing layer 48, the air introducing layer 248 is not provided to a rear end of the sensor element 201. Thus, the air introducing layer 248 is not exposed to the rear end surface of the sensor element 201. Instead, as illustrated in FIG. 10, a part of an upper surface of the air introducing layer 248 is exposed to the reference gas introducing space 43. The exposed portion serves as the inlet portion 48c of the air introducing layer 248. Note that a line obtained by projecting a contour of the inlet portion 48c as viewed from the above on the section in FIG. 9 is represented by a two-dot chain line in FIG. 9. The reference gas is introduced to the air introducing layer 248 from the inlet portion 48c through the reference gas introducing space 43. The air introducing layer 248 includes a gas flowing space 249. The first and second gas flowing spaces 49a and 49b included in the gas flowing space 24 are provided over the region R (see FIGS. 9 and 10) from the inlet portion 48c (front end of the inlet portion 48c in this modification) to the reference electrode 42 (rear end of the reference electrode 42 in this modification) in a reference gas flowing direction (front-rear direction in this modification). In FIGS. 9 and 10, the first and second gas flowing spaces 49a and 49b are each provided to extend forward and backward to be longer than the region R. Also in the sensor element 201 according to the modification, since the gas flowing space 249 is formed at least over the region R, it is possible to prevent the oxygen concentration in the periphery of the reference electrode 42 from being excessively higher than the original oxygen concentration in the reference gas as in the above-described embodiment. However, a case in which the reference gas introducing space 43 is absent and the inlet portion 48c of the air introducing layer 48 is present only to the rear end surface of the sensor element 101 as in the above-described embodiment is preferable because penetration of the poisoning substance into the reference electrode 42 can be more effectively suppressed. Note that a rear end of the air introducing layer 248 may be provided to the rear end of the sensor element 201 in the sensor element 201.

In the above-described embodiment, the sensor element 101 of the gas sensor 100 includes the first internal cavity 20, the second internal cavity 40, and the third internal cavity 61, but this is not restrictive. For example, as in the above-described sensor element 201 illustrated in FIG. 8, the third internal cavity 61 may be omitted. In the sensor element 201 according to the modification illustrated in FIG. 8, the gas inlet port 10, the first diffusion controlling portion 11, the buffer space 12, the second diffusion controlling portion 13, the first internal cavity 20, the third diffusion controlling portion 30, and the second internal cavity 40 are formed between the lower surface of the second solid electrolyte layer 6 and the upper surface of the first solid electrolyte layer 4 to be adjacent to one another and communicate with one another in this sequence. The measurement electrode 44 is provided on the upper surface of the first solid electrolyte layer 4 in the second internal cavity 40. The measurement electrode 44 is formed by being covered by a fourth diffusion controlling portion 45. The fourth diffusion controlling portion 45 is a film made of a ceramic porous material such as alumina ($Al_2O_3$). The fourth diffusion controlling portion 45 serves to limit the amount of NOx flowing into the measurement electrode 44 as in the fourth diffusion controlling portion 60 according to the above-described embodiment. In addition, the fourth diffusion controlling portion 45 also serves as a protective film of the measurement electrode 44. The top electrode portion 51a of the auxiliary pump electrode 51 is formed immediately above the measurement electrode 44. The sensor element 201 having such a configuration can also detect the NOx concentration by using the measurement pump cell 41 as in the above-described embodiment.

Note that, in the sensor element 201 illustrated in FIG. 8, no modification may be made on the reference gas introducing space 43, the air introducing layer 248, and the gas flowing space 249, and the fourth diffusion controlling portion 60 and the third internal cavity 61 may be provided as in the above-described embodiment. In addition, in the sensor element 101 according to the above-described embodiment, no modification may be made on the fourth diffusion controlling portion 60 and the third internal cavity 61, and the same configuration as the reference gas introducing space 43, the air introducing layer 248, and the gas flowing space 249 illustrated in FIGS. 8 to 10 may be employed.

Although the air introducing layer 48 also serves as the insulating layer of the reference electrode lead 47 in the above-described embodiment, an insulating layer of the reference electrode lead 47 may be present in addition to the air introducing layer 48. In this case, the air introducing layer 48 may be provided in any configuration as long as the reference gas can be introduced. For example, in FIGS. 9 and 10, at least a part of the air introducing layer 248 has to be exposed to the reference gas introducing space 43, and may be provided from the reference electrode 42 side to the rear end of the detour portion 47d, for example.

Although not specifically described in the above embodiment, the gas flowing space 49 differs from pores of the air introducing layer 48. For example, at least one of the size and shape of the gas flowing space 49 may be distinguished from a corresponding one of those of pores of the air introducing layer 48.

The pressure release hole 75 passes through the air introducing layer 48 in the above-described embodiment, but this is not restrictive. The pressure release hole 75 may communicate with at least one of pores of the air introducing layer 48 and the gas flowing space 49.

Figure 11:
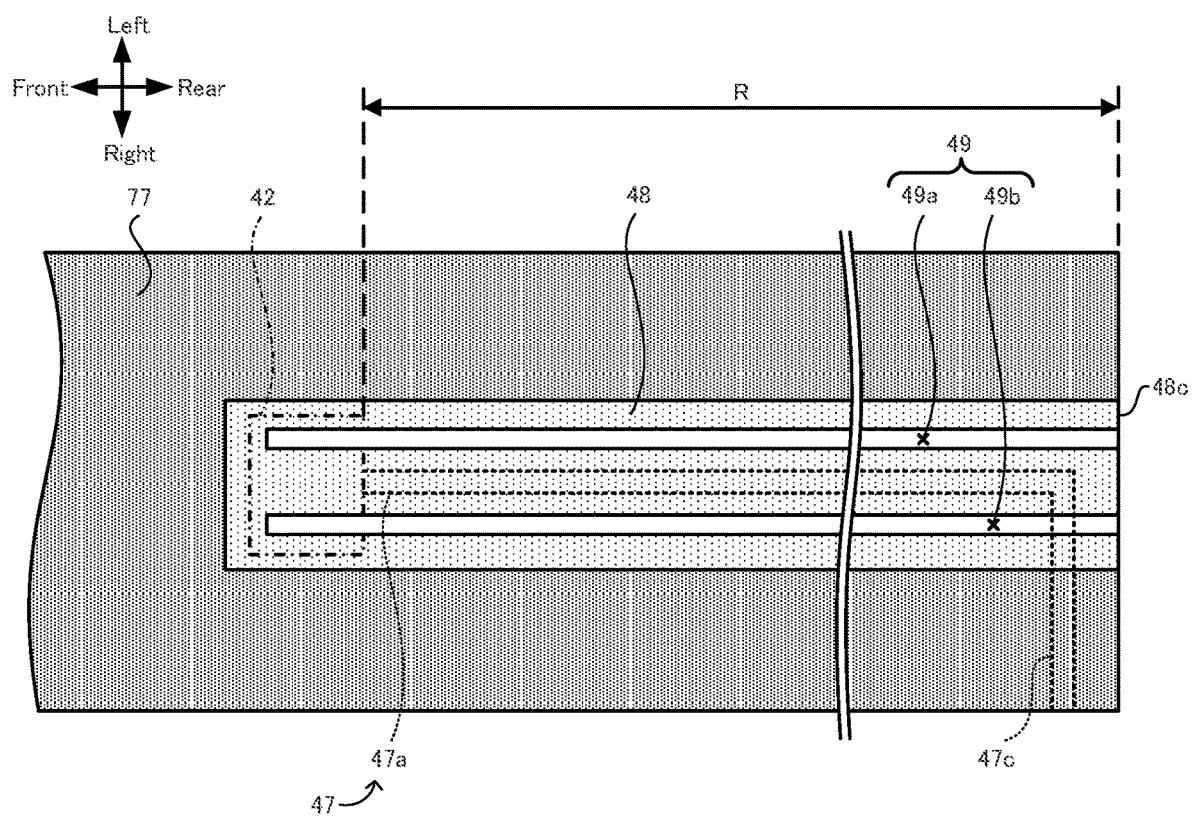
FIG. 11 is a sectional view of an air introducing layer 48 according to a modification.

In the above-described embodiment, the pressure release hole 75 may be omitted in the sensor element 101 as illustrated in FIG. 11. In this case, the detour portion 47d may be omitted in the reference electrode lead 47. In FIG. 11, the reference electrode lead 47 does not include the detour portion 47d, and the first linear portion 47a directly extends to the third linear portion 47c to be connected with the third linear portion 47c. In addition, in the above-described embodiment, the shape of the air introducing layer 48 may be changed. For example, since the sensor element 101 does not include the pressure release hole 75 and the detour portion 47d in FIG. 11, the air introducing layer 48 does not include the wide portion 48a and the narrow portion 48b, and the width in the left-right direction is equal in the front-rear direction.

The control current Ip3 is direct current at a constant value in the above-described embodiment, but this is not restrictive. For example, the control current Ip3 may be pulsed and discontinuous current. In addition, the control current Ip3 is direct current at a constant value in the above-described embodiment, which always flows in the direction in which oxygen is pumped in to the periphery of the reference electrode 42, but this is not restrictive. For example, there may be a period during which the control current Ip3 flows in the direction in which oxygen is pumped out from the periphery of the reference electrode 42. In this case, the general direction of movement of oxygen in a sufficiently long predetermined period may be the direction in which oxygen is pumped in to the periphery of the reference electrode 42.

In the above-described embodiment, the outer pump electrode 23 serving as the outer electrode of the measurement pump cell 41 also serves as the measurement-object gas side electrode of the reference gas regulation pump cell 90, but this is not restrictive. The outer electrode of the measurement pump cell 41 and the measurement-object gas side electrode of the reference gas regulation pump cell 90 may be formed separately on the outer surface of the sensor element 101. In addition, as long as the measurement-object gas side electrode of the reference gas regulation pump cell 90 is provided in a portion exposed to the measurement-object gas in the sensor element 101, the providing position is not limited to the outer surface. For example, the measurement-object gas side electrode may be provided in the measurement-object gas flowing portion.

In the above-described embodiment, the voltage Vp2 of the variable power supply 46 is controlled to maintain constant the electromotive force V2 detected by the measurement pump-controlling oxygen partial pressure detection sensor cell 82, and the concentration of nitrogen oxides in the measurement-object gas is calculated by using the pump current Ip2 under the control. This is, however, not restrictive as long as the specific gas concentration in the measurement-object gas is detected on the basis of the voltage between the reference electrode 42 and the measurement electrode 44. For example, the measurement electrode 44, the first solid electrolyte layer 4, the third substrate layer 3, and the reference electrode 42 may be combined to constitute an electrochemical sensor cell serving as an oxygen partial pressure detecting device. This electrochemical sensor cell is capable of detecting an electromotive force according to a difference between the amount of oxygen produced by reduction of the NOx component in the ambient atmosphere of the measurement electrode 44 and the amount of oxygen included in the reference gas and thereby determines the concentration of the NOx component in the measurement-object gas. In this case, this electrochemical sensor cell corresponds to the detecting device of the present invention.

The reference electrode 42 is formed directly on the upper surface of the third substrate layer 3 in the above-described embodiment, but this is not restrictive. For example, the reference electrode 42 may be formed directly on the lower surface of the first solid electrolyte layer 4.

The reference gas is the air in the above-described embodiment. The reference gas is, however, not limited to this but may be any gas that can be used as a standard for detection of a specific gas concentration in the measurement-object gas. For example, the space 149 may be filled with a gas with an oxygen concentration adjusted in advance to a predetermined value (>oxygen concentration in the measurement-object gas) as the reference gas.

The sensor element 101 detects the NOx concentration in the measurement-object gas in the above-described embodiment, but this is not restrictive. The sensor element may detect any specific gas concentration in the measurement-object gas, for example, the oxygen concentration in the measurement-object gas.

EXAMPLES

The following describes concrete examples of manufacturing gas sensors as examples. The present invention is, however, not limited to the following examples.

Experimental Example 1

The gas sensor 100 illustrated in FIGS. 1 to 5 was produced by the manufacturing method described above as Experimental Example 1. The green sheets used for production of the sensor element 101 were formed by tape casting of a mixture of zirconia particles containing 4 mol % yttria as a stabilizing agent with an organic binder and an organic solvent. The green compacts 145a and 145b illustrated in FIG. 1 were compacted talc powder. The air introducing layer 48 was made of ceramic of alumina, and the gas flowing space 49 is made of theobromine as a vanishing material. The length of the region R in the front-rear direction was 60 mm, the length of the gas flowing space 49 in the front-rear direction was 61 mm. The total minimum sectional area Smin of the gas flowing space 49 was 0.00001 mm$^2$. The porosity of the air introducing layer 48 was 40%.

Experimental Examples 2 to 10

Gas sensors 100 of Experimental Examples 2 to 10 were produced in the same manner as Experimental Example 1, except that the total minimum sectional area Smin was changed as illustrated in Table 1.

Note that, of Experimental Examples 1 to 10, only the first gas flowing space 49a was formed as the gas flowing space 49 in Experimental Examples 1 to 6, and the first and second gas flowing spaces 49a and 49b were formed as the gas flowing space 49 in Experimental Examples 7 to 10.

Comparative Example 1

A gas sensor was produced in the same manner as Experimental Example 1, except that the gas flowing space 49 was omitted.

[Evaluation of Detection Accuracy]

The gas sensor of Experimental Example 1 was mounted to a piping. The heater 72 was then powered on to heat the sensor element 101 at a temperature of 800° C. Subsequently, the variable power supplies 25, 46, 52, and 92 were connected with the gas sensor of Experimental Example 1. The voltage Vp3 of the variable power supply 92 was adjusted such that the control current Ip3 is direct current of 20 μA. In this state, by using nitrogen as a base gas, a model gas with an oxygen concentration of 10% and a NOx concentration of 500 ppm was prepared and was flowed in the piping as the measurement-object gas. This state was kept 20 minutes, and the electromotive force Vref (voltage between the outer pump electrode 23 and the reference electrode 42) during this period was measured. The measurement was performed in the same manner in Experimental Examples 2 to 10 and Comparative Example 1. Note that it is likely that the electromotive force Vref is increased over time from the value at the start of measurement as the oxygen concentration in the periphery of the reference electrode 42 becomes higher than the oxygen concentration in the reference gas. In addition, it is likely that the pump current Ip2 is decreased from the correct vale (value corresponding to 500 ppm NOx concentration) as the electromotive force Vref is increased. Accordingly, by setting the value of the electromotive force Vref at the start of measurement as 100%, if the measured electromotive force Vref falls within a predetermined range (not greater than 120%) after 20 minutes, the detection accuracy of the NOx concentration was determined as excessively high ("A"). If the measured electromotive force Vref is beyond the predetermined range after 15 minutes and before 20 minutes, the detection accuracy of the NOx concentration was determined as high ("B"). If the measured electromotive force Vref is beyond the predetermined range before 15 minutes, the detection accuracy of the NOx concentration was determined as low ("F").

Table 1 shows the evaluation test results. As shown in Table 1, the detection accuracy of the NOx concentration is low in Comparative Example 1 that does not include the gas flowing space 49, whereas the detection accuracy of the NOx concentration is high in Experimental Examples 1 to 10 including the gas flowing space 49. In addition, the detection accuracy of the NOx concentration is excessively high in Experimental Examples 3 to 10 in which the total minimum sectional area Smin is not smaller than 0.0001 $mm^2$. In none of Comparative Example 1 and Experimental Examples 1 to 10, the electromotive force Vref became excessively small from the value at the start of measurement (100%). These results indicate that any of Comparative Example 1 and Experimental Examples 1 to 10 has a sufficient amount of oxygen that is pumped in to the periphery of the reference electrode 42 by the reference gas regulation pump cell 90. If the pump-in amount of oxygen is sufficient, the oxygen concentration in the periphery of the reference electrode 42 became excessively higher than the oxygen concentration in the reference gas in Comparative Example 1, whereas the oxygen concentration did not become excessively high in Experimental Examples 1 to 10 because the gas flowing space 49 is included.

TABLE 1

| | Total Minimum Sectional are S [$mm^2$] | Evaluation of Detection Accuracy |
|---|---|---|
| Comparative Example 1 | 0 | F |
| Experimental Example 1 | 0.00001 | B |
| Experimental Example 2 | 0.00005 | B |
| Experimental Example 3 | 0.0002 | A |
| Experimental Example 4 | 0.0005 | A |
| Experimental Example 5 | 0.001 | A |
| Experimental Example 6 | 0.006 | A |
| Experimental Example 7 | 0.01 | A |
| Experimental Example 8 | 0.02 | A |
| Experimental Example 9 | 0.05 | A |
| Experimental Example 10 | 0.08 | A |

The present application claims priority from Japanese Patent Application No. 2017-067780, filed on Mar. 30, 2017, the entire contents of which are incorporated herein by reference.

What is claimed is:

1. A sensor element comprising:
   a layered body that includes a plurality of stacked layers of an oxygen ion-conductive solid electrolyte, and that includes a measurement-object gas flowing portion which a measurement-object gas is introduced and flowed in;
   a measurement electrode provided on an inner peripheral surface of the measurement-object gas flowing portion;
   a measurement-object gas side electrode provided in a region of the layered body that is exposed to the measurement-object gas;
   a reference electrode that is formed inside of the layered body; and
   a reference gas introducing layer disposed at least in part between two layers of the plurality of stacked layers and made of a porous material having pores that introduces a reference gas being used as a standard for detection of a specific gas concentration in the measurement-object gas and that flows the reference gas to the reference electrode, the reference gas introducing layer including an inlet portion that is located at a rear end of the sensor element serving as an inlet of the reference gas and one or more gas flowing spaces that are different from the pores provided over a region from the inlet portion to the reference electrode in a direction in which the reference gas is flowed.

2. The sensor element according to claim 1, wherein each of the one or more gas flowing spaces is separated from the reference electrode.

3. The sensor element according to claim 1,
   wherein the layered body extends in a longitudinal direction from a front end of the sensor element exposed to the measurement-object gas to the rear end of the sensor element exposed to the reference gas, and the reference gas introducing layer is provided from the reference electrode to an end surface of the layered body in the longitudinal direction, and
   the inlet portion of the reference gas introducing layer is exposed to the end surface of the layered body.

4. The sensor element according to claim 1,
   wherein the one or more gas flowing spaces have a total minimum sectional area Smin of not smaller than 0.0001 $mm^2$, the total minimum sectional area Smin being a total of minimum sectional areas each perpendicular to the direction in which the reference gas is flowed.

5. A gas sensor comprising the sensor element according to claim 1.

6. The gas sensor according to claim 5, further comprising:
   an electrochemical sensor cell,
   wherein the electrochemical sensor cell includes the measurement electrode and the reference electrode and the electrochemical sensor cell detects an electromotive force between the reference electrode and the measurement electrode; and a reference gas regulation pump cell including the reference electrode, the measurement-object gas side electrode provided in the region of the layered body that is exposed to the measurement-object gas, and a power supply that applies a control voltage between the reference electrode and the measurement-object gas side electrode to pump in oxygen to a periphery of the reference electrode, wherein the specific gas concentration in the measurement-object gas is calculated based on the electromotive force.

7. The gas sensor according to claim 5, further comprising:

a measurement pump cell, wherein the measurement pump cell includes the measurement electrode, an outer electrode provided on an outer surface of the layered body, and a variable power supply generating a first control voltage to maintain a first voltage between the measurement electrode and the reference electrode at a constant value;

a reference gas regulation pump cell including the reference electrode, the measurement-object gas side electrode, and a power supply that applies a second control voltage between the reference electrode and the measurement-object gas side electrode to pump in oxygen to a periphery of the reference electrode;

the measurement pump cell being configured to detect a value of a pump current when the variable power supply is generating the first control voltage, and wherein the specific gas concentration in the measurement-object gas is calculated based on the pump current.

* * * * *